Patented Aug. 27, 1940

2,212,959

UNITED STATES PATENT OFFICE 2,212,959

PHOTOPRINTING PROCESS

Maximilian Paul Schmidt and Oskar Süs, Wiesbaden-Biebrich, Germany, assignors to Kalle & Co. Aktiengesellschaft, Wiesbaden-Biebrich, Germany No Drawing. Application January 17, 1939, Serial No. 251,338. In Germany January 26, 1938

19 Claims. (Cl. 95—6)

The invention relates to diazo-photoprinting processes and more particularly to light sensitive materials useful for diazotype purposes.

Diazo-photoprinting processes have to fulfil a series of requirements regarding the stability and light sensitiveness of the light sensitive materials used as well as regarding the properties of the finished pictures such as stability to water, to storing and to light. These properties of the light sensitive materials and the pictures prepared thereby depend partly upon the azo-components used. The number of known azo-components which practically enter into consideration for making diazotypes is only small.

It has now been found that hydroxynaphthoimidazoles are very useful azo-components for making diazotypes. They allow of preparing prints which are very fast to light and stable to storing. The ground which even after a prolonged storing does not tend to yellow has an especially good stability. The picture contrasts are therefore not only good immediately after printing but are preserved unaltered also when the prints are stored for a long period of time. Also the stability to water of the pictures is good.

The hydroxynaphthoimidazoles are especially suitable for the preparation of stable "two-component-papers" that is to say, papers with diazo compound and azo-component. For preparing such materials the hydroxynaphthoimidazoles, for instance in the form of their salts, are applied on a support, preferably together with aminodiazo-compounds of the benzene series, particularly tertiary para-aminodiazo compounds, the usual additions such as organic acids, metal salts, thiourea or the like being added to the layers, if desired. The new azo-components can also be used in developing solutions for wet developing in so far as they are sufficiently soluble in water or alkaline solutions respectively. They are, however, principally suited for the preparation of photo-printing papers which can be developed with ammonia gas.

In the process of the present invention there are used in the first line among the hydroxynapthtoimidazoles the naphtho-1'.2':4.5-imidazoles substituted in the naphthalene nucleus by hydroxy groups, especially the beta-mono-hydroxy-compounds. For instance, the 7'-hydroxynaphtho-1'.2':4.5-imidazole of the following formula:

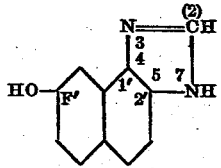

is very useful. Also the corresponding 6'-hydroxynaphtho-1'.2':4.5 imidazole is well suitable. The new azo-components may contain further usual substituents in the naphthalene nucleus in so far as the solubility of the azo-components is not disadvantageously affected thereby. For instance, alkyl groups or chlorine enter into question. Preferably, compounds are used, however, which do not contain further substituents in the naphthalene nucleus. Also the hydrogen atoms of the imidazole ring, especially the hydrogen atom situated in 2-position of the imidazole ring, may be substituted by an alkyl radical of low molecular weight, especially a methyl or ethyl group.

The azo-components used according to the present invention may be prepared in the usual manner, for instance, by reaction of diaminonaphthols with formic acid, acetic acid, propionic acid, succinic acid or the like.

The following examples serve to illustrate the invention but they are not intended to limit it thereto; the parts are by weight:

(1) 25 parts of tartaric acid or of another organic acid, 20 parts of boric acid, 40 parts of thiourea, 20 parts of the hydrochloride of 2-methyl - 7'- hydroxynaphtho-1'.2':4.5 - imidazole and 18 parts of the zinc chloride double salt of the diazo compound from para-amino-N-diethylaniline are dissolved in 1000 parts of water and applied in the usual manner on a suitable support, for instance, paper. Layers are obtained which are very stable to storing and sensitive to light. The prints prepared by means of this material have a very good stability to storing and fastness to light. Even when exposed to day-light for a prolonged time the white of the ground hardly yellows and the dyestuff of the lines hardly fades.

Similar layers may be obtained with other suitable diazo-compounds, for instance, with the diazo-compound from para-amino-N-ethyl-N-benzylaniline or para-amino-N-dimethylaniline.

(2) 20 parts of citric acid, 20 parts of boric acid, 40 parts of sodium naphthalene-trisulfonate, 40 parts of thiourea, 18 parts of the hydrochloride of 7'-hydroxynaphtho-1'.2':4.5-imidazole and 20 parts of the zinc chloride double salt of the diazo compound from para-amino-N-diethylaniline are dissolved in 1000 parts of water and paper is sensitized with the solution. Prints prepared by means of this paper are above all distinguished by a very good resistance of their lines to water. Also when sprayed with water for a long time the lines and the ground are stable.

(3) Photoprinting materials similar to those obtained according to Examples 1 and 2 may be made by proceeding in the manner indicated in these examples but by using instead of the azo-components mentioned there the corresponding 6'-hydroxy compounds.

(4) A suitable photoprinting material is obtained by spreading on paper a solution of 40 parts of citric acid, 30 parts of boric acid, 40 parts of sodium naphthalene-trisulfonate, 50 parts of thiourea, 30 parts of aluminium sulfate, 14 parts of the sulfate of the diazo-compound from para-aminodiphenylamine and 16 parts of 2-methyl - 6' - hydroxynaphtho - 1'.2':4.5-imidazole in 1000 parts of water. Instead of the azo-component mentioned there may also be used with a good success the 2 - ethyl - 6' - hydroxynaphtho-1'.2':4.5-imidazole.

(5) 2.5 parts of the zinc chloride double salt of the diazo-compound from 1-diethylamino-4-aminobenzene, 2 parts of tartaric acid, 5 parts of thiourea and 1.5 parts of the hydrochloride of 2 - carboxyethyl - 7' - hydroxynaphtho - 1'.2':4.5-imidazole are dissolved in 100 parts of water. The light sensitive material prepared by means thereof is suitable for the preparation of photoprints by developing with ammonia gas after exposure.

Instead of the diazo-compound from 1-diethylamino-4-amino-benzene there may be used corresponding quantities of the diazo-compound of 1-hydroxyethyl-ethyl-amino-4-aminobenzene.

We claim:

1. Light sensitive material consisting of a sheet support carrying a light sensitive diazo compound and as coupling component a hydroxynaphthoimidazole compound.

2. Light sensitive material as claimed in claim 1 wherein the said diazo compound is a para-aminodiazo compound.

3. Light sensitive material consisting of a sheet support carrying a light sensitive diazo compound and as coupling component a hydroxynaphtho-1'.2':4.5-imidazole compound.

4. Light sensitive material as claimed in claim 3 wherein the said diazo compound is a para-aminodiazo compound.

5. Light sensitive material consisting of a sheet support carrying a light sensitive diazo compound and as coupling component a β-hydroxynaphthoimidazole compound.

6. Light sensitive material as claimed in claim 5 wherein the said diazo compound is a para-aminodiazo compound.

7. Light sensitive material consisting of a sheet support carrying a light sensitive para-aminodiazo compound and as coupling component a β - hydroxynaphtho - 1'.2':4.5 - imidazole compound.

8. Light sensitive material as claimed in claim 7 wherein the said para-amino diazo compound is a tertiary one.

9. Light sensitive material consisting of a sheet support carrying a light sensitive para-aminodiazo compound and as coupling component a β-monohydroxynaphtho-1'.2:4.5-imidazole compound.

10. Light sensitive material as claimed in claim 9 wherein the said para-aminodiazo compound is a tertiary one.

11. Light sensitive material consisting of a cellulosic sheet support carrying a light sensitive para-dialkylaminodiazo compound and as coupling component a 7'-monohydroxynaphtho-1'.2':4.5-imidazole compound.

12. Light sensitive material consisting of a cellulosic sheet support carrying a light sensitive para-dialkylaminodiazo compound and as coupling component a 6'-monohydroxynaphtho-1'.2':4.5-imidazole compound.

13. Light sensitive material consisting of a paper carrying the diazo compound of para-amino-N-diethylaniline and as coupling component the 7'-hydroxynaphtho-1'.2':4.5-imidazole.

14. Light sensitive material consisting of a paper carrying the diazo compound of para-amino-N-diethylaniline and as coupling component the 6'-hydroxynaphtho-1'.2':4.5-imidazole.

15. Light sensitive material consisting of a paper carrying the diazo compound of para-amino-N-diethylaniline and as coupling component the 2-methyl-7'-hydroxynaphtho-1'.2':4.5-imidazole.

16. Light sensitive material consisting of a sheet support carrying a light sensitive diazo compound and as coupling component a hydroxy-1'.2':4.5-imidazole compound the imino group of which is unsubstituted.

17. Light sensitive material as claimed in claim 16 wherein the said diazo compound is a para-amino diazo compound.

18. Light sensitive material consisting of a sheet support carrying a light sensitive para-amino-diazo compound and as coupling component a β-monohydroxynaphtho 1'.2':4.5-imidazole compound the imino group of which is unsubstituted.

19. Light sensitive material consisting of a sheet support carrying a light sensitive para-aminodiazo compound and as coupling component a β-monohydroxynaphtho-1'.2:4.5-imidazole compound having an alkyl residue in the =CH— group of the imidazole ring and being unsubstituted in the imino group.

MAXIMILIAN PAUL SCHMIDT.
OSKAR SÜS.